(12) United States Patent
Yajima

(10) Patent No.: US 10,760,664 B2
(45) Date of Patent: Sep. 1, 2020

(54) METHOD OF PRODUCING WAVE GEAR DEVICE AND WAVE GEAR DEVICE

(71) Applicant: CANON KABUSHIKI KAISHA, Tokyo (JP)

(72) Inventor: Akira Yajima, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 15/842,742

(22) Filed: Dec. 14, 2017

(65) Prior Publication Data

US 2018/0106354 A1 Apr. 19, 2018

Related U.S. Application Data

(62) Division of application No. 14/516,434, filed on Oct. 16, 2014, now Pat. No. 9,874,272.

(30) Foreign Application Priority Data

Oct. 21, 2013 (JP) .................. 2013-218142

(51) Int. Cl.
*F16H 49/00* (2006.01)
*F16H 57/023* (2012.01)
*B25J 9/10* (2006.01)

(52) U.S. Cl.
CPC ......... *F16H 49/001* (2013.01); *F16H 57/023* (2013.01); *B25J 9/1025* (2013.01); *Y10T 29/49464* (2015.01); *Y10T 74/19642* (2015.01)

(58) Field of Classification Search
CPC .............................. F16H 49/001; B25J 9/1025
See application file for complete search history.

(56) References Cited

U.S. PATENT DOCUMENTS

| 8,384,260 | B2 * | 2/2013 | Kanayama | ............. | H02K 7/003 |
| | | | | | 310/83 |
| 8,616,086 | B2 * | 12/2013 | Hirai | ..................... | B25J 9/1025 |
| | | | | | 74/640 |
| 2015/0285356 | A1 * | 10/2015 | Kurogi | .................. | F16H 49/001 |
| | | | | | 74/640 |

FOREIGN PATENT DOCUMENTS

JP 2010266008 A 11/2010

* cited by examiner

*Primary Examiner* — Randell J Krug
(74) *Attorney, Agent, or Firm* — Canon U.S.A., Inc. IP Division

(57) ABSTRACT

A circular spline is secured to a housing. An output member is positioned relative to the circular spline, an outer race of a bearing is secured to the housing, and an inner race of the bearing is secured to the output member. A flex spline is positioned relative to the circular spline and secured to the output member. A wave generator is positioned relative to the circular spline, and a support member, by which the wave generator is rotatably supported, is secured to the housing.

10 Claims, 11 Drawing Sheets

METHOD OF PRODUCING WAVE GEAR DEVICE AND WAVE GEAR DEVICE

CROSS-REFERENCE TO RELATED APPLICATION

This application is a Divisional of U.S. application Ser. No. 14/516,434, filed Oct. 16, 2014, which claims priority from Japanese Patent Application No. 2013-218142, filed Oct. 21, 2013, all of which are hereby incorporated by reference herein in their entireties.

BACKGROUND OF THE INVENTION

Field of the Invention

The present invention relates to a method of producing a wave gear device, by which a circular spline, a flex spline, and a wave generator are positioned, and relates to a wave guide device.

Description of the Related Art

Wave gear devices, with which high speed-reduction ratios can be obtained despite their comparatively small sizes, are widely used for speed reducers of motors for driving articulations of robot arms. The wave gear device includes three main components and five positioning components, which position the three main elements.

The three main components are an internal gear referred to as a circular spline, an external gear referred to as a flex spline, and an elliptical cam member referred to as a wave generator. The circular spline is an annular rigid gear having teeth on its inner side. The flex spline is a thin flexible annular gear having teeth on its outer side. Two of the five positioning components are a housing and an output member. The circular spline is fastened to the housing. The flex spline, which is an output of the wave gear device, is fastened to the output member. The other three of the five positioning components are a cross roller bearing disposed between the housing and the output member, a bearing that holds rotation of the wave generator, and a support member that holds the bearing and is fastened to the housing.

Here, it is known that accuracy with which the circular spline, the flex spline, and the wave generator are attached significantly affects rotational accuracy of the wave gear device. Accordingly, it is required that components such as a housing be highly accurately processed in the related art. Thus, when securing the circular spline to the housing, it is required that the flatness and the parallelism of the attachment surface be highly accurately realized. Also, when securing the flex spline and the wave generator, it is required that the coaxiality of the axis of the circular spline secured to the housing and the axes of the flex spline and the wave generator be highly accurately realized.

Japanese Patent Laid-Open No. 2009-257409 has proposed a method of assembling a wave gear device in which a circular spline, a flex spline, and a wave generator are positioned with an inner circumferential surface of a housing as a reference surface by using a jig.

An articulated multi-axis robot arm includes a plurality of articulations, in each of which a drive motor and the wave gear device are disposed. Thus, when attachment accuracy of the circular spline, the flex spline, and the wave generator of the wave gear device is poor in each articulation, the axes of the components become misaligned and inclined, and rotational accuracy is degraded. This significantly degrades the performance of the robot arm (JIS B 8432: Manipulating industrial robots-Performance criteria and related test methods). That is, for the wave gear device, it is important to highly accurately align the central axes of the circular spline, the flex spline, and the wave generator, which are the main components of the wave gear device.

However, according to the Japanese Patent Laid-Open No. 2009-257409, the circular spline, the flex spline, and the wave generator are positioned with reference to the housing. Thus, it is required that the reference surface of the housing, in addition to the circular spline, the flex spline, and the wave generator, are highly accurately processed and produced. Accordingly, since the housing is highly accurately processed and produced, the cost and time required for producing the wave gear device are increased.

In particular, according to the Japanese Patent Laid-Open No. 2009-257409, a reference surface for the circular spline and a reference surface for the jig used to position the flex spline need to be formed on the inner circumferential surface of the housing. As the area of the reference surface increases in the housing, the cost and time required for processing and producing the housing tend to increase. Thus, according to Japanese Patent Laid-Open No. 2009-257409, the cost is increased since it is required that the reference surface of the housing be large.

When time and the cost are reduced by degrading accuracy of the reference surface of the housing, misalignment of the axes of the circular spline, the flex spline, and the wave generator is increased.

SUMMARY OF THE INVENTION

The present invention provides a method of producing a wave gear device, by which the central axes of a circular spline, a flex spline, and a wave generator can be accurately aligned with one another and time required for production can be reduced. The present invention also provides a wave gear device.

A method according to a first aspect of the present invention is a method of producing a wave gear device that includes a housing, a circular spline, a flex spline, a wave generator, an output member, a bearing, and a support member. The housing has a cylindrical shape. The annular circular spline is attached to an inside of the housing and has internal teeth. The flex spline has a cylindrical barrel portion, which has external teeth, and an attachment portion, which inwardly extends from an end of the barrel portion in a radial direction, and is disposed inside the circular spline. The wave generator is disposed inside the flex spline, deforms the flex spline in the radial direction to bring part of the flex spline into engagement with part of the circular spline, and moves an engagement position, where the internal teeth of the circular spline are in engagement with the external teeth of the flex spline, in a circumferential direction. The output member is attached to the attachment portion. The bearing has an outer race, which is secured to the housing, and an inner race, which is secured to the output member, and supports the output member such that the output member is rotatable. The support member supports the wave generator such that the wave generator is rotatable. The support member is secured to the housing. The method includes the steps of: securing the circular spline to the housing, positioning the output member relative to the circular spline, (a) securing the outer race of the bearing to the housing and (b) securing the output member to the inner race of the bearing after the securing of the circular spline has been performed, positioning the flex spline relative to the circular spline, securing the attachment portion of the flex spline to the output member after the positioning of the flex spline has been performed, positioning the wave generator relative to the circular spline, and securing the support member that supports the wave generator to the housing after the positioning of the wave generator has been performed. A wave gear device according to a second aspect of the present invention includes a housing, a circular spline, a flex spline, a wave generator, an output member, a bearing, and a support member. The housing has a cylindrical shape. The annular circular spline is attached to an inside of the housing and has internal teeth. The flex spline has a cylindrical barrel portion, which has external teeth, and an attachment portion, which inwardly extends from an end of the barrel portion in a radial direction. The flex spline is disposed inside the circular spline. The wave generator is disposed inside the flex spline, deforms the flex spline in the radial direction to bring part of the flex spline into engagement with part of the circular spline, and moves an engagement position, where the internal teeth of the circular spline are in engagement with the external teeth of the flex spline, in a circumferential direction. The output member is attached to the attachment portion. The bearing has an outer race, which is secured to the housing, and an inner race, which is secured to the output member, and supports the output member such that the output member is rotatable. The support member supports the wave generator such that the wave generator is rotatable. The support member is secured to the housing. In the wave gear device, an outer circumferential surface of the circular spline and an outer circumferential surface of the support member are spaced apart from an inner circumferential surface of the housing.

Further features of the present invention will become apparent from the following description of exemplary embodiments with reference to the attached drawings.

DESCRIPTION OF THE EMBODIMENTS

Embodiments of the present invention will be described in detail below with reference to the drawings.

First Embodiment

Figure 1A:
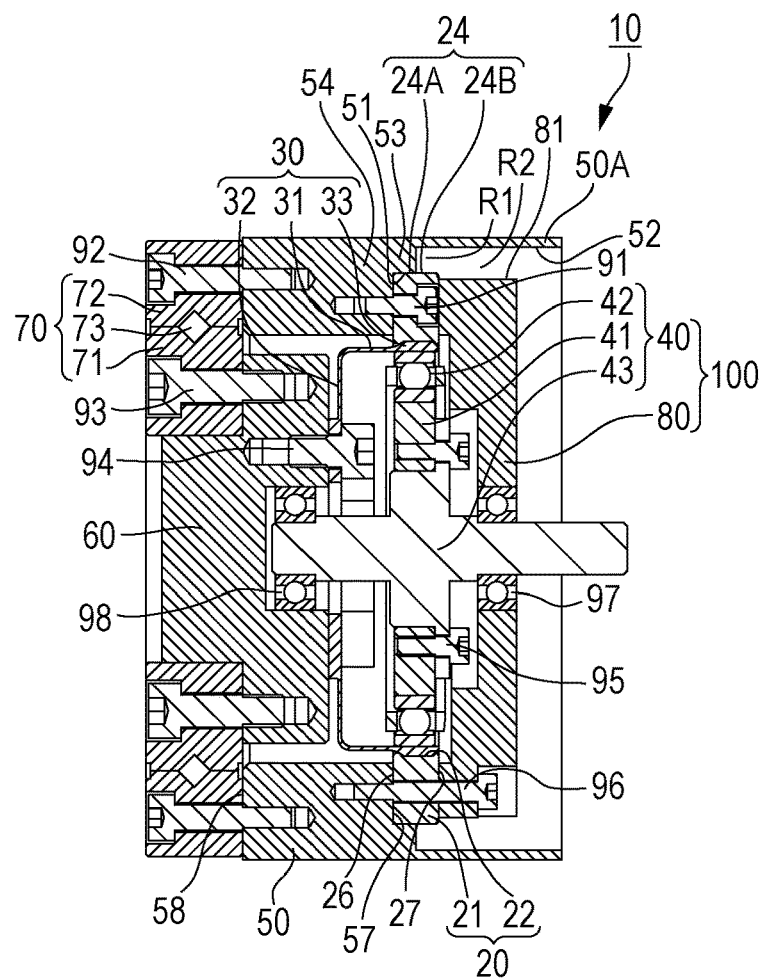
FIGS. 1A and 1B are explanatory views schematically illustrating the structure of a wave gear device produced by a method of producing according to a first embodiment.
Figure 1B:
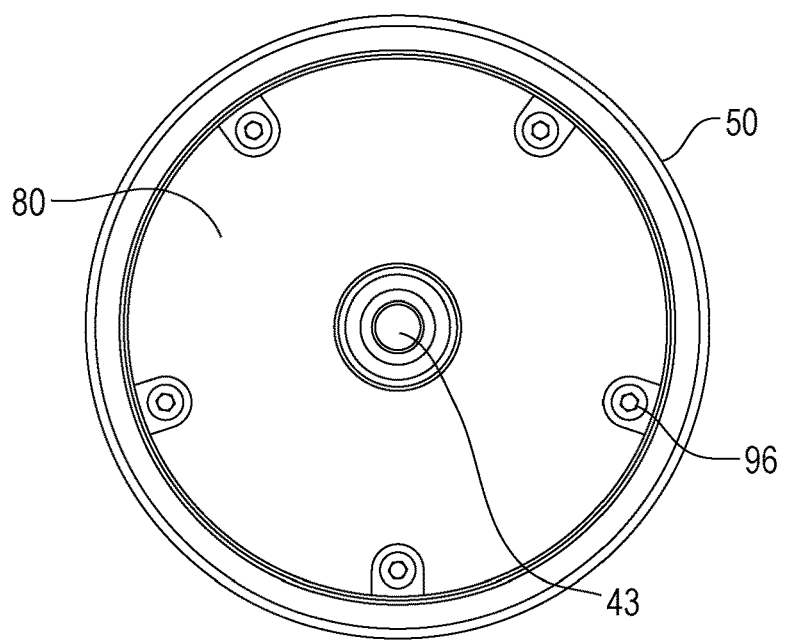

FIGS. 1A and 1B are explanatory views schematically illustrating the structure of a wave gear device produced by a method of producing according to a first embodiment of the present invention. Out of these drawings, FIG. 1A is a sectional view of the wave gear device, and FIG. 1B is a plan view of the wave gear device.

A wave gear device 10 includes a rigid internal gear (circular spline) 20, a flex external gear (flex spline) 30, and a wave generator 40.

The wave gear device 10 also includes a housing 50, an output member 60, a bearing 70, and a support member 80. The housing 50 houses the circular spline 20. The output member 60 serves as a flange of the flex spline 30. The bearing 70 uses a cross roller bearing or the like. The support member 80 serves as a housing of the wave generator 40. The housing 50 has a cylindrical main body 50A, a projection 53, and a projection 54. The projection 53 inwardly projects in a radial direction, which is perpendicular to the axial direction, from an inner circumferential surface 52 of the main body 50A. The projection 54 projects in a radial direction further inward from the inner circumferential surface 52 of the main body 50A than the projection 53. A part of an end surface 57, the end surface 57 being one of two axial end surfaces 57 and 58 of the projection 54, is connected to the projection 53. Thus, a step portion is formed between the projection 53 and projection 54. An inner surface 51 of the projection 53 is a housing reference surface (reference surface) with which a part 24A of an outer circumferential surface 24 of the circular spline 20 is brought into engagement.

The circular spline 20 includes a gear main body 21 and a plurality of internal teeth 22. The gear main body 21 is formed of an annular rigid member. The internal teeth 22 are spaced apart from one another in the circumferential direction at an inner circumference of the gear main body 21. The number of internal teeth 22 of the circular spline 20 is, for example, 102. The circular spline 20 is secured to the inside of the housing 50 by bolts 91. Specifically, the circular spline 20 is brought into engagement with the step portion formed by the projection 53 and the projection 54. Thus, the part 24A of the outer circumferential surface 24 of the circular spline 20 is brought into contact with the inner circumferential surface 51 of the projection 53, and an end surface 26, which is one of two axial end surfaces 26 and 27 of the circular spline 20, is brought into contact with another part of the end surface 57 other than the part of the end surface 57. The end surface 57 is one of the end surfaces of the projection 54. In this state, the circular spline 20 is secured to the projection 54 by the bolts 91.

The flex spline 30 includes a barrel portion 31 and an attachment portion 32. The barrel portion 31 is formed of a thin cylindrical material. The attachment portion 32 is connected to one axial end of the barrel portion 31. A plurality of external teeth 33 are formed on an outer circumferential surface of the barrel portion 31 at the other axial end of the barrel portion 31. The barrel portion 31 has flexibility.

The flex spline 30 is a so-called cup-type flexible external gear, which has a cup shape having an opening on the side opposite to the attachment portion 32 side in the axial direction. The attachment portion 32 is a plate-shaped member inwardly extending in a radial direction, which is perpendicular to the axial direction, from the one axial end of the barrel portion 31. The attachment portion 32 of the flex spline 30 is secured to the output member 60 by bolts 94.

The number of external teeth 33 of the flex spline 30 is less than the number of internal teeth 22 of the circular spline 20. For example, the number of external teeth 33 of the flex spline 30 is 100, which is less than 102, the number of internal teeth 22 of the circular spline 20, by 2.

A tooth trance direction of the external teeth 33 is parallel to a direction along the outer circumferential surface of the barrel portion 31 when the barrel portion 31 is not elastically deformed. The flex spline 30 is disposed inside the circular spline 20 such that the external teeth 33 oppose the internal teeth 22 of the circular spline 20.

The output member 60, which is secured to the attachment portion 32 of the flex spline 30 by the bolts 94, is rotated as the flex spline 30 is rotated.

The bearing 70 includes an inner race 71, an outer race 72, and a rolling member 73 such as a roller. Alternatively, the rolling member 73 may include, for example, balls. The outer race 72 is secured to the housing 50 by bolts 92, more specifically secured to the other end surface 58 of the projection 54 of the housing 50, and the inner race 71 is secured to the output member 60 by bolts 93. Thus, the output member 60 is rotatably supported.

The wave generator 40 is fitted into the flex spline 30, that is, the inside of the barrel portion 31. The wave generator 40 is in contact with the inner circumferential surface of the barrel portion 31 at the other end of the barrel portion 31 so as to cause the barrel portion 31 to deform in the radial direction, thereby elastically deforming the barrel portion 31 into a substantially elliptical shape.

The wave generator 40 includes a substantially elliptical cam member 41, a bearing 42, and an input shaft member 43. The bearing 42 is an elastically deformable thin component disposed at an outer circumference of the cam member 41. The input shaft member 43 is secured to the cam member 41 by bolts 95. The input shaft member 43 projects from both the sides of the cam member 41 in the axial direction. Specifically, the input shaft member 43 includes a substantially disc-shaped flat plate portion, which is secured to the cam member 41, and a shaft portion, which extends from both the sides of the flat plate portion in a direction perpendicular to the flat plate portion. The flat plate portion is secured to the cam member 41 by the bolts 95, and the shaft portion is rotated by receiving input of an external rotational force.

The wave generator 40 is rotatably supported by the support member 80 through a bearing 97. Specifically, one axial end of the shaft portion of the input shaft member 43 of the wave generator 40 is supported by the support member 80 through the bearing 97. The support member 80 is secured to the housing 50 by bolts 96. The other axial end of the shaft portion of the input shaft member 43 is supported by the output member 60 through a bearing 98. The support member 80 is secured to the housing 50 by the bolts 96. Specifically, the support member 80 is in contact with the other end surface 27 of the circular spline 20 and secured to the projection 54 of the housing 50 by the bolts 96 with the circular spline 20 interposed therebetween. The outer circumferential surface 24 of the circular spline 20 and an outer circumferential surface 81 of the support member 80 are spaced apart from the inner circumferential surface of the housing 50, specifically, the inner circumferential surface 52 of the main body 50A of the housing 50. More specifically, another part 24B, which is a part of the outer circumferential surface 24 of the circular spline 20 other than the part 24A, is spaced apart from the inner circumferential surface 52 of the housing 50. Thus, a gap R1 serving as a first gap is formed between the housing 50 and the circular spline 20, and a gap R2 serving as a second gap is formed between the housing 50 and the support member 80.

When the flex spline 30 is elastically deformed into a substantially elliptical shape, some of the teeth of the circular spline 20 and some of the teeth of the flex spline 30 are brought into engagement with one another in two engagement portions located on the major axis of the substantially elliptical shape. When the cam member 41 is rotated about the rotational axis, the engagement portions (engagement positions) of the internal teeth 22 of the circular spline 20 and the external teeth 33 of the flex spline 30 are moved in the circumferential direction. The flex spline 30 is rotated at a rotational speed, which is reduced relative to the rotational speed of the cam member 41 in a reducing ratio of 50 calculated in accordance with the difference between the numbers of teeth of the circular spline 20 and the flex spline 30 (=difference in the number of teeth between both the splines/the number of teeth of the flex spline 30).

Figure 2:
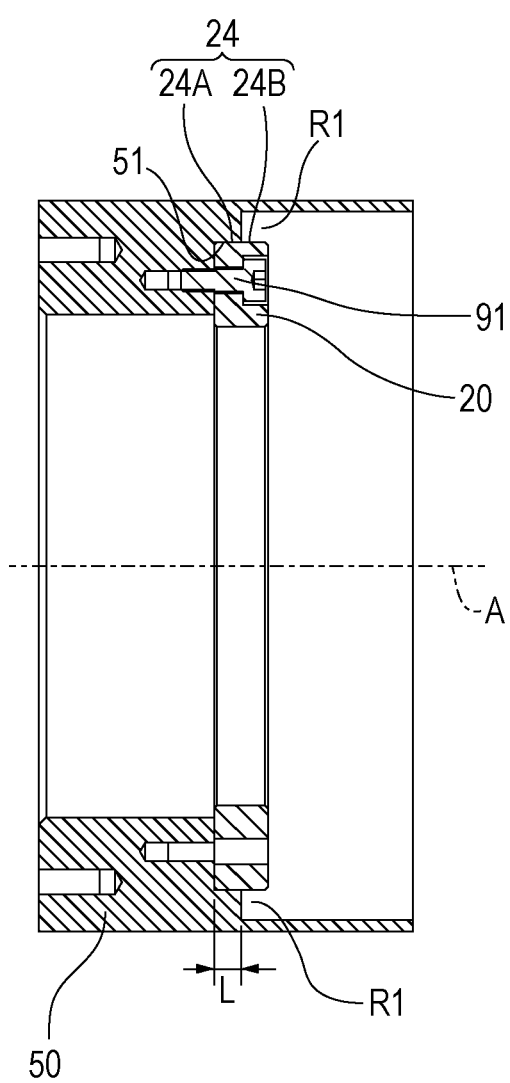
FIG. 2 is a view for explaining a first securing step of the method of producing the wave gear device according to the first embodiment.
Figure 6A:
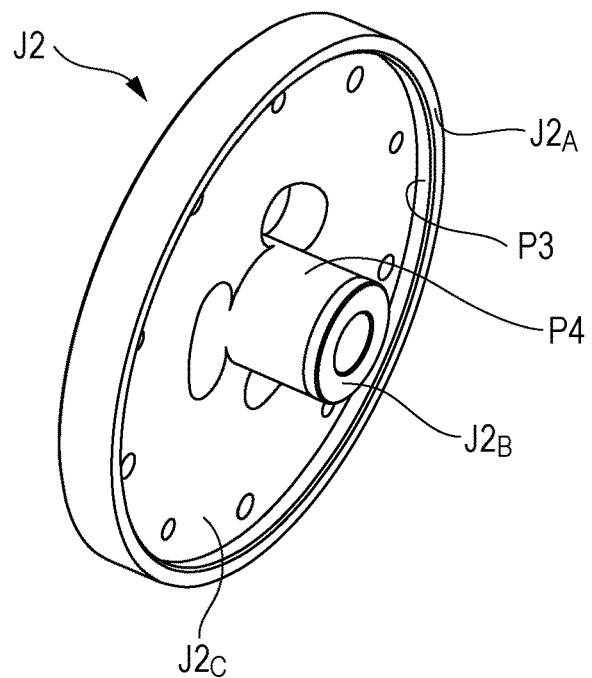
FIGS. 6A to 6C illustrate a second jig.
Figure 6B:
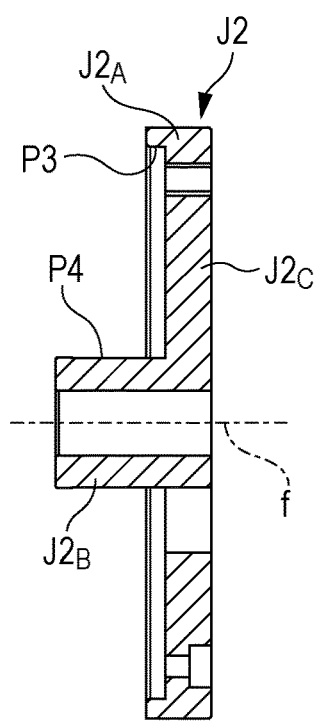
Figure 6C:
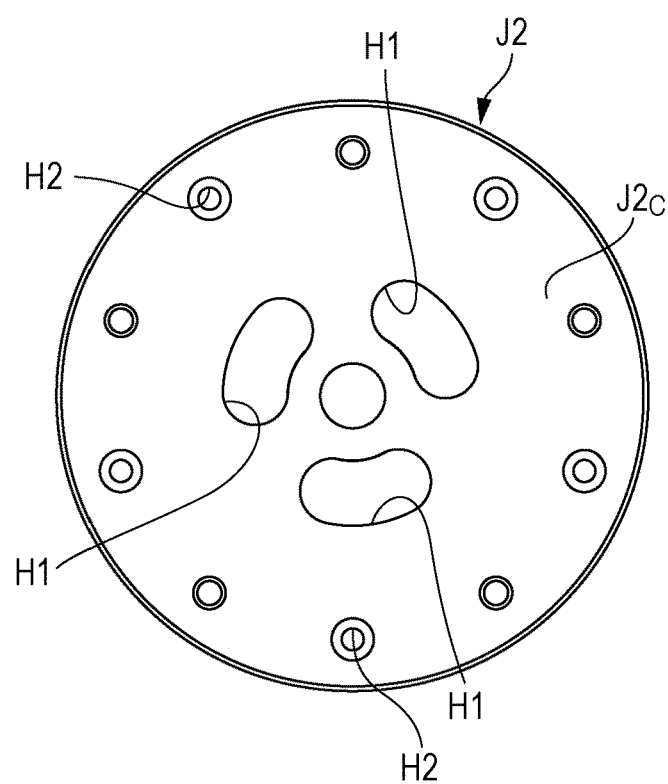
Figure 7:
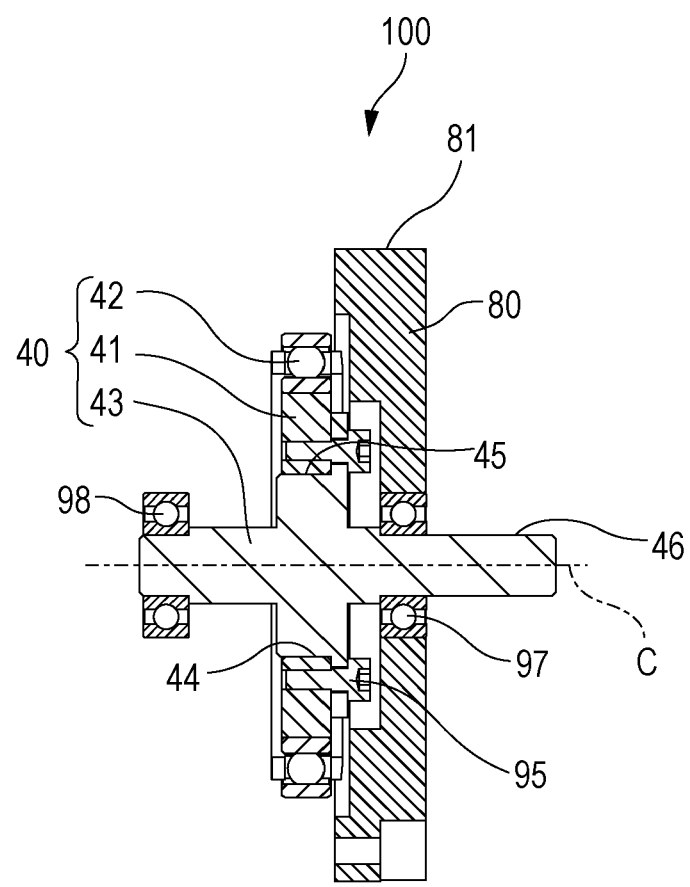
FIG. 7 is a sectional view of a wave generator unit.

An assembling procedure (method of producing) of the wave gear device 10 according to the first embodiment is described below. The wave gear device 10 is assembled in a procedure including the following steps (1) to (8):

(1) Step of securing circular spline 20 (first securing step: FIG. 2);
(2) Step of positioning output member 60 (first positioning step: FIGS. 3 and 4A to 4C);
(3) Step of securing bearing 70 and output member 60 (second securing step: FIGS. 3 and 4A to 4C);
(4) Step of positioning flex spline 30 (second positioning step: FIGS. 5A, 5B and 6A to 6C);
(5) Step of securing flex spline 30 (third securing step: FIGS. 5A, 5B, and 6A to 6C);
(6) Step of assembling wave generator unit 100 (FIG. 7);
(7) Step of positioning wave generator 40 (third positioning step (FIGS. 8A, 8B, and 9A to 9C); and
(8) Step of securing wave generator 40 (fourth securing step (FIGS. 8A, 8B, and 9A to 9C).

The details of steps (1) to (8) are described below.

(1) Step of Securing Circular Spline 20 (First Securing Step: FIG. 2)

FIG. 2 is a view for explaining the first securing step, illustrating a sectional view in a state in which the circular spline 20 is attached to the housing 50. Initially, as illustrated in FIG. 2, the circular spline 20 is secured to the housing 50 by the bolts 91. In so doing, the gap R1 is formed between the housing 50 and an outer circumferential surface of the circular spline 20 secured to the housing 50.

A circular spline reference surface (reference surface) 24 is provided on the outer circumferential surface of the circular spline 20. In the present embodiment, the outer circumferential surface of the circular spline 20 is the reference surface 24. Also, the housing reference surface (reference surface) 51 is provided on an inner circumferential surface of the housing 50. The housing reference surface 51 is a reference surface to position the circular spline 20 and is brought into engagement with (in contact with) part of the reference surface 24. In the present embodiment, an inner circumferential surface of the projection 53 of the housing 50 is the reference surface 51.

A length L of the reference surface 51 in the axial direction is a length sufficient for positioning of the circular spline 20. The length L is determined by the flatness of a radially extending contact surface of the housing 50 to be in contact with the circular spline 20 and a squareness of the contact surface and the reference surface 51. In order to position the circular spline 20, it is not required that the reference surface 51 have a length longer than the length L. Thus, the gap R1 (relief), which drops the need of highly accurate processing, is provided for the housing 50. The length L of the reference surface 51 in the axial direction can be equal to or less than a half the length of the reference surface 24 in the axial direction. That is, when the circular spline 20 has been secured to the housing 50, equal to or more than half of the other part 24B of the reference surface 24 of the circular spline 20 in the axial direction is exposed, and the gap R1 is formed on the radially outer side of the exposed reference surface 24.

The axis of the housing 50 can be aligned with an axis A of the circular spline 20, and the reference surface 51 can be formed with high accuracy. In a downstream step, components are attached with reference to the circular spline 20. Thus, with the reference surface 24 of the circular spline 20 having high accuracy, the reference surface 51 is not necessarily formed with high accuracy or may be omitted.

In the first embodiment, as illustrated in FIG. 2, the circular spline 20 is disposed in the housing 50 with the reference surface 24 thereof disposed along the reference surface 51 and secured to the housing 50 by the bolts 91. The housing 50 is secured to the circular spline 20 with reference to the reference surface 24 in the present step.

(2) Step of Positioning Output Member 60 (First Positioning Step: FIGS. 3 and 4A to 4C)

Figure 3:
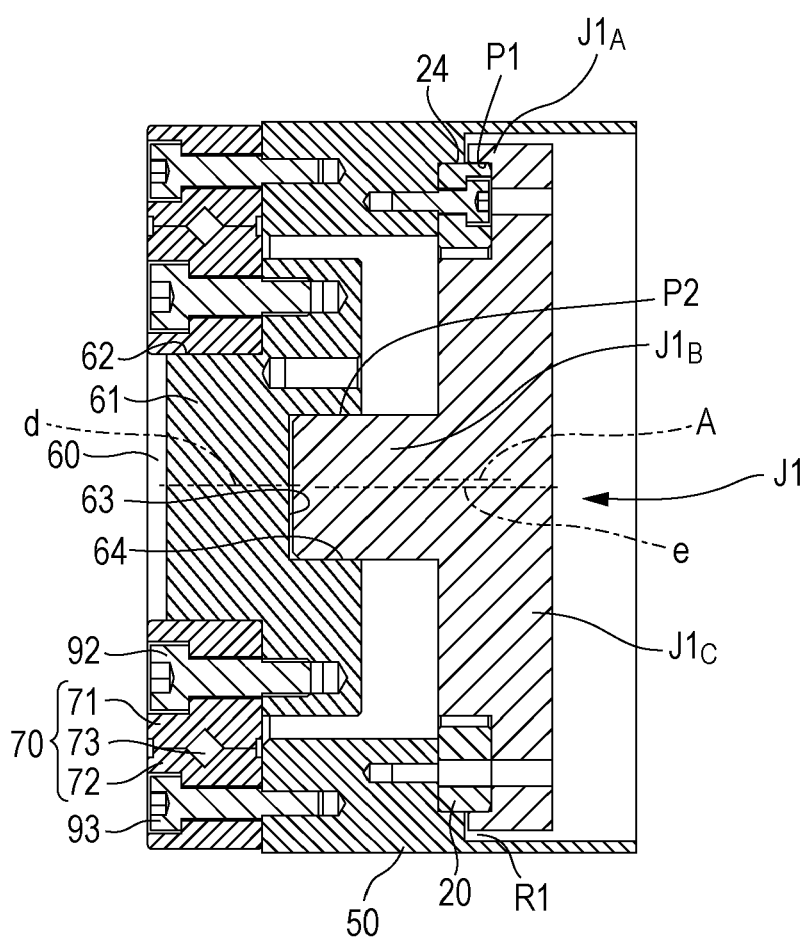
FIG. 3 is a view for explaining a first positioning step and a second securing step of the method of producing the wave gear device according to the first embodiment.
Figure 4A:
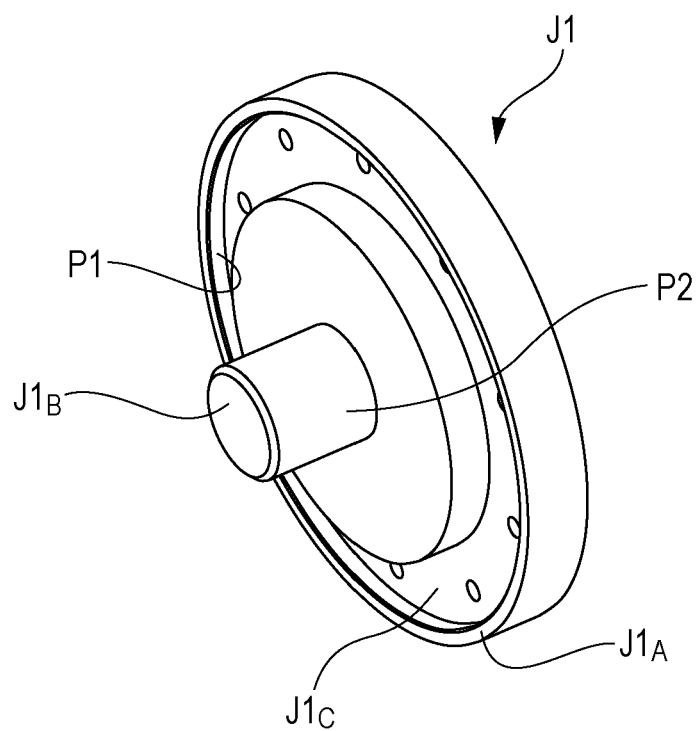
FIGS. 4A to 4C illustrate a first jig.
Figure 4B:
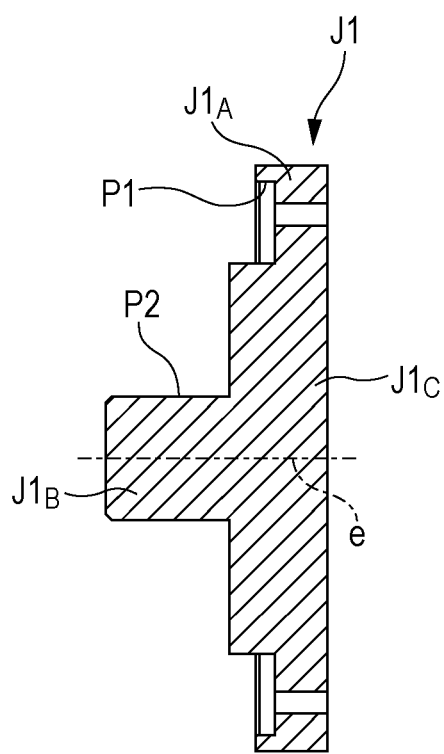
Figure 4C:
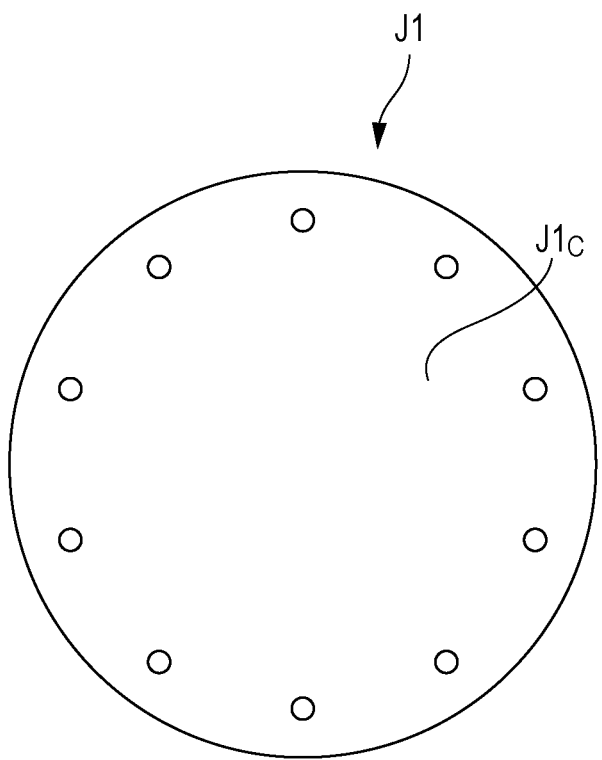

FIG. 3 is a sectional view for explaining a first positioning step and a second securing step. In a state illustrated in FIG. 3, the output member 60 is positioned with a jig J1, and the output member 60 and the bearing 70 are secured. FIGS. 4A to 4C illustrate the jig J1. Out of FIGS. 4A to 4C, FIG. 4A is a perspective view of the jig J1, FIG. 4B is a sectional view of jig J1, and FIG. 4C is a plan view of the jig J1.

In the present step, the jig J1, which serves as a jig for positioning the output member (first jig) illustrated in FIGS. 4A to 4C, is prepared. The jig J1 has a reference surface P1 and a reference surface P2. The reference surface P1 serves as a first reference surface to be positioned with reference to the circular spline 20. The reference surface P2 serves as a second reference surface that positions the output member 60. More specifically, the jig J1 has an annular portion $J1_A$, a shaft portion $J1_B$, and a connecting portion $J1_C$. The annularly shaped annular portion $J1_A$ serves as a first annular portion. The shaft portion $J1_B$ serves as a first shaft portion and is coaxial with the annular portion $J1_A$. The connecting portion $J1_C$ connects the annular portion $J1_A$ and the shaft portion $J1_B$ to each other. An inner circumferential surface of the annular portion $J1_A$ has the reference surface P1, and an outer circumferential surface of the shaft portion $J1_B$ has the reference surface P2.

As illustrated in FIG. 3, the output member 60 has a reference surface 62 and a reference surface 64, which share a common axis d. The reference surface 62 is a side wall surface of a projection 61, which is brought into engagement with an inner circumferential surface of the bearing 70. The reference surface 64 is a side wall surface of a hole portion 63, which is brought into engagement with the jig J1. The jig J1 is formed such that the reference surface P1 and the reference surface P2 share a common axis e. The reference surface P1 is brought into engagement with the reference surface 24. The reference surface P2 is brought into engagement with the reference surface 64 of the output member 60.

As illustrated in FIG. 3, the reference surface P1 of the jig J1 and the outer circumferential surface of the circular spline 20 are brought into engagement each other by bringing the annular portion $J1_A$ of the jig J1 into engagement with the gap R1. Simultaneously, the reference surface P2 and the reference surface 64 of the hole portion 63 of the output member 60 are brought into engagement with each other by bringing the shaft portion $J1_B$ into engagement with the hole portion 63 formed at the rotational center of the output member 60. Thus, the output member 60 is positioned relative to the circular spline 20 by engaging the reference surface P1 of the jig J1 with the circular spline 20 each other and engaging the reference surface P2 of the jig J1 with the output member 60. The axis d of the bearing 70 and the output member 60 can be aligned with the axis A of the reference surface 24 by bringing the jig J1 into engagement with the reference surface 24 of the circular spline 20 and the reference surface 64 of the output member 60, and bringing the reference surface 62 of the output member 60 into engagement with the bearing 70.

(3) Step of Securing Bearing 70 and Output Member 60 (Second Securing Step: FIGS. 3 and 4A to 4C)

Next, the output member 60 is secured to the housing 50 with the bearing 70 interposed therebetween while the output member 60 is positioned by the jig J1. That is, after the first positioning step has been performed, the outer race 72 of the bearing 70 is secured to the housing 50 by the bolts 92 and the output member 60 is secured to the inner race 71 of the bearing 70 by the bolts 93. In this step, the bearing 70 and the output member 60 are secured with reference to the reference surface 24. After the bearing 70 and the output member 60 are secured by the bolts 92 and 93, the jig J1 is removed.

(4) Step of Positioning Flex Spline 30 (Second Positioning Step: FIGS. 5A, 5B and 6A to 6C)

Figure 5A:
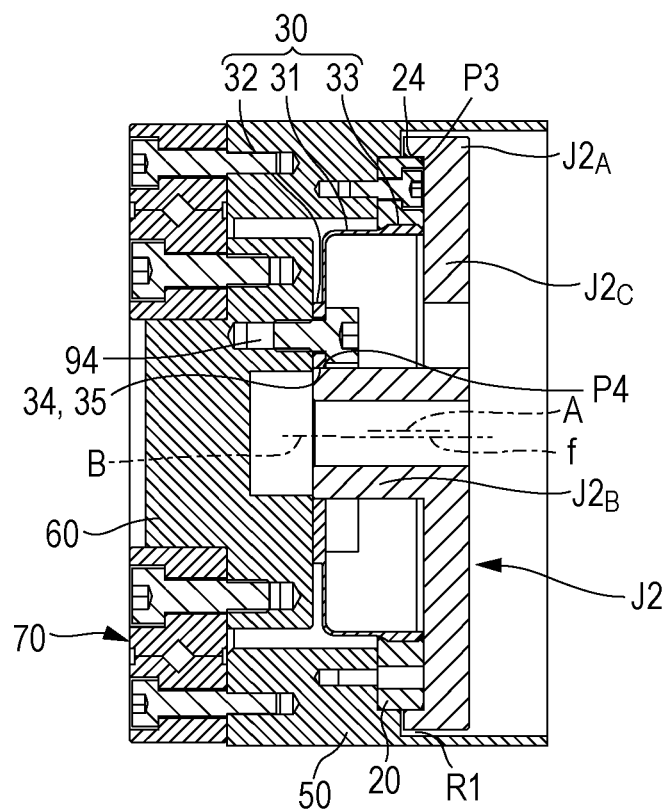
FIGS. 5A and 5B are views for explaining a second positioning step and a third securing step of the method of producing the wave gear device according to the first embodiment.
Figure 5B:
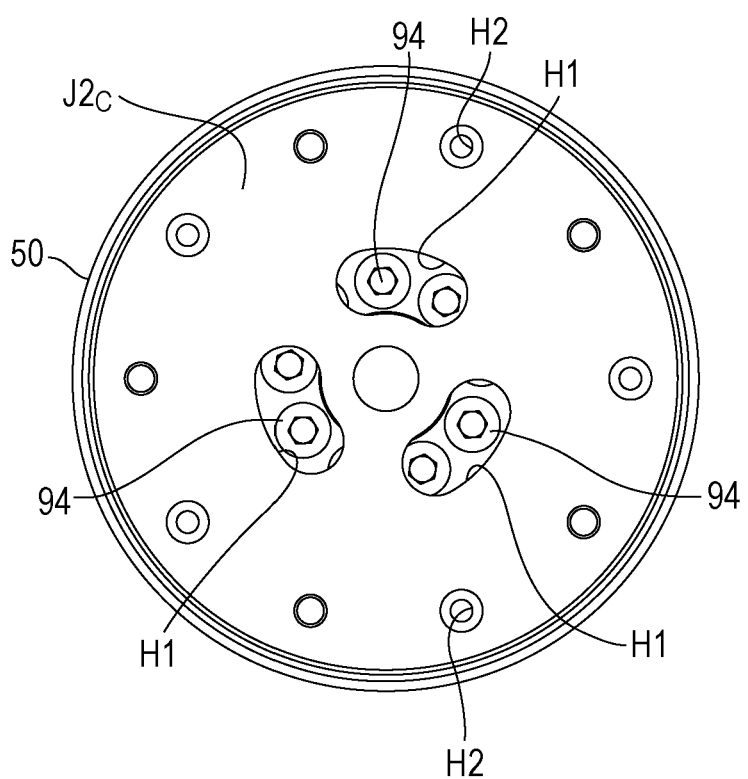

FIGS. 5A and 5B are views for explaining a second positioning step and a third securing step. In FIGS. 5A and 5B, the flex spline 30 is disposed in the housing 50, positioned with a jig J2, and secured. FIG. 5A is a sectional view of the above-described state, and FIG. 5B is a plan view of the above-described state. FIGS. 6A to 6C illustrate the jig J2. Out of FIGS. 6A to 6C, FIG. 6A is a perspective view of the jig J2, FIG. 6B is a sectional view of jig J2, and FIG. 6C is a plan view of the jig J2.

In the present step, the jig J2, which serves as a jig for positioning the flex spline 30 (second jig) illustrated in FIGS. 6A to 6C, is prepared. The jig J2 has a reference surface P3 and a reference surface P4. The reference surface P3 serves as a third reference surface to be positioned with reference to the circular spline 20. The reference surface P4 serves as a fourth reference surface that positions the flex spline 30. More specifically, the jig J2 has an annular portion $J2_A$, a shaft portion $J2_B$, and a connecting portion $J2_C$. The annularly shaped annular portion $J2_A$ serves as a second annular portion. The shaft portion $J2_B$ serves as a second shaft portion and is coaxial with the annular portion $J2_A$. The connecting portion $J2_C$ connects the annular portion $J2_A$ and the shaft portion $J2_B$ to each other. An inner circumferential surface of the annular portion $J2_A$ has the reference surface P3, and an outer circumferential surface of the shaft portion $J2_B$ has the reference surface P4.

As illustrated in FIGS. 5A and 5B, the flex spline 30 has a cup shape. The flex spline 30 has a hole portion 34 formed at a central portion (rotational center of attachment portion 32) thereof. A side wall surface of the hole portion 34 is a reference surface 35, which is a flex spline reference surface serving as a reference of the flex spline 30.

The jig J2 is formed such that the reference surface P3 and the reference surface P4 share a common axis f. The reference surface P3 is brought into engagement with the reference surface 24. The reference surface P4 is brought into engagement with the reference surface 35.

The jig J2 has bolt access holes H1 formed in the connecting portion J2$_C$ thereof. The bolts 94, which secure the flex spline 30 to the output member 60, can be tightened through the bolt access holes H1.

The flex spline 30 is temporarily disposed inside the circular spline 20 such that the flex spline 30 is engaged with the internal teeth 22 of the circular spline 20. Then, the jig J2 is inserted from behind (cup opening side) the flex spline 30. The reference surface P3 of the jig J2 and the outer circumferential surface of the circular spline 20 are brought into engagement with each other by bringing the annular portion J2$_A$ of the jig J2 into engagement with the gap R1. Simultaneously, the reference surface P4 and the reference surface 35 of the hole portion 34 are brought into engagement with each other by bringing the shaft portion J2$_B$ into engagement with the hole portion 34 portion 34 formed in the attachment portion 32. Thus, the flex spline 30 is positioned relative to the circular spline 20 by bringing the reference surface P3 of the jig J2 into engagement with the circular spline 20 and bringing the reference surface P4 of the jig J2 into engagement with the flex spline 30. This simultaneous engagement of the jig J2 with the reference surface 24 of the circular spline 20 and the reference surface 35 of the flex spline 30 permits an axis B of the flex spline 30 to be aligned with the axis A of the reference surface 24 of the circular spline 20. In so doing, since the gap R1 is provided in the housing 50, two positions can be simultaneously brought into engagement with each other. Thus, the axis B of the flex spline 30 can be aligned with the axis A of the reference surface 24.

(5) Step of Securing Flex Spline 30 (Third Securing Step: FIGS. 5A, 5B, and 6A to 6C)

While the above-described reference surfaces being in their respective engaged states, the flex spline 30 is secured to the output member 60 by the bolts 94 by using the bolt access holes H1 formed in the jig J2. In this step, the flex spline 30 is secured to the output member 60 with reference to the reference surface 24.

Furthermore, as jig removal portions that allow the jig J2 to be removed after the flex spline 30 has been positioned and secured, the connecting portion J2$_C$ of the jig J2 has, for example, tapped holes H2. Thus, the jig J2 can be easily removed.

(6) Step of Assembling Wave Generator Unit 100 (FIG. 7)

Figure 9A:
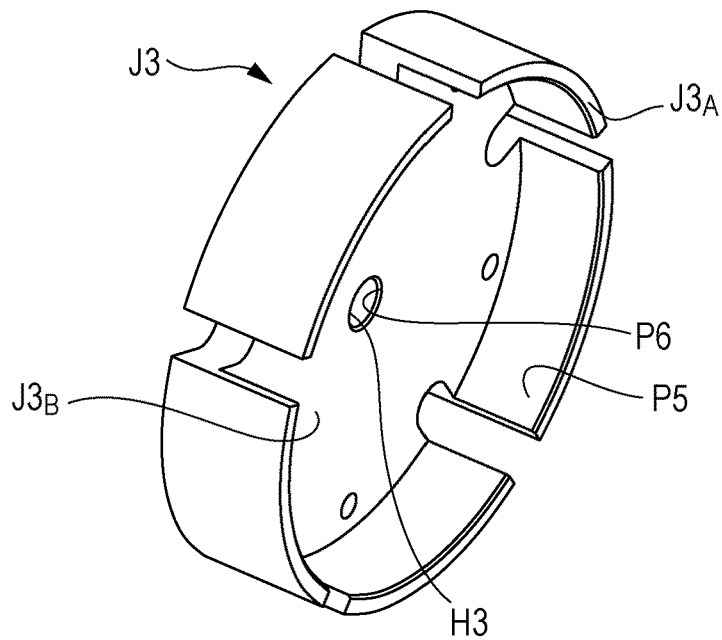
FIGS. 9A to 9C illustrate a third jig.
Figure 9B:
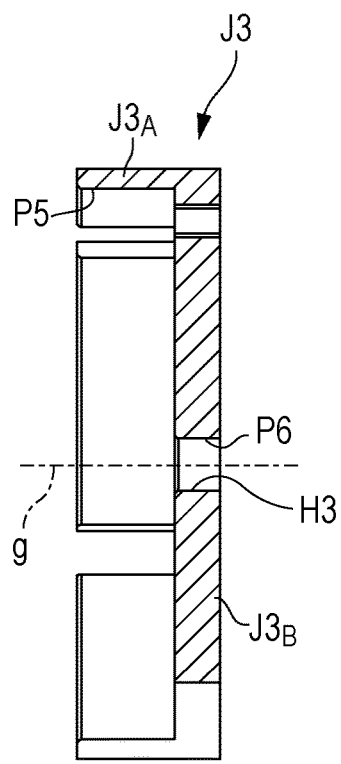
Figure 9C:
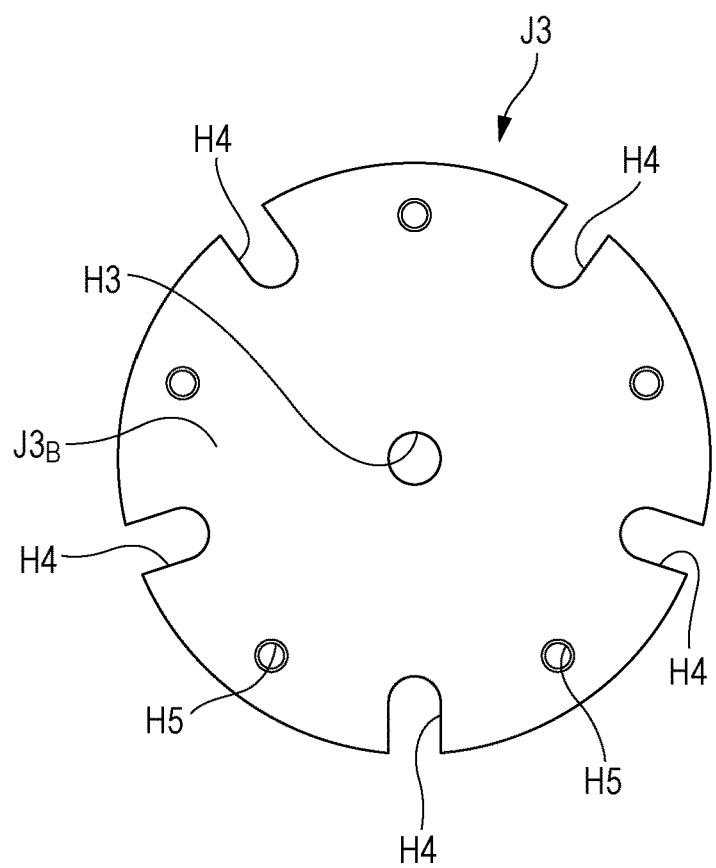

FIG. 7 is a sectional view of a wave generator unit 100. The cam member 41 illustrated in FIG. 7 has a substantially elliptical outer circumferential surface and a reference surface 44 at a central portion thereof. The reference surface 44, which is a cylindrical inner circumferential surface of the cam member 41, serves as a reference of the cam member 41. The input shaft member 43 has a reference surface 45 and a reference surface 46, which share a common axis C. The reference surface 45 is a cylindrical outer circumferential surface brought into engagement with the reference surface 44. The reference surface 46 is a cylindrical outer circumferential surface brought into engagement with a jig J3 (FIGS. 9A to 9C). The jig J3 serves as a jig for positioning the input shaft (third jig).

The cam member 41 is disposed in the input shaft member 43 along the reference surface 45 of the input shaft member 43, which is secured to the cam member 41 by the bolts 95. An inner race of the bearing 97 is attached to the input shaft member 43, and an outer race of the bearing 97 is secured to the support member 80. At this time, by eliminating a clearance by applying a preload to the bearing 97, the bearing 97 can be attached to the support member 80 so as to share the common axis C. A unit assembled in the present step is referred to as the wave generator unit 100.

(7) Step of Positioning Wave Generator 40 (Third Positioning Step: FIGS. 8A, 8B, and 9A to 9C)

Figure 8A:
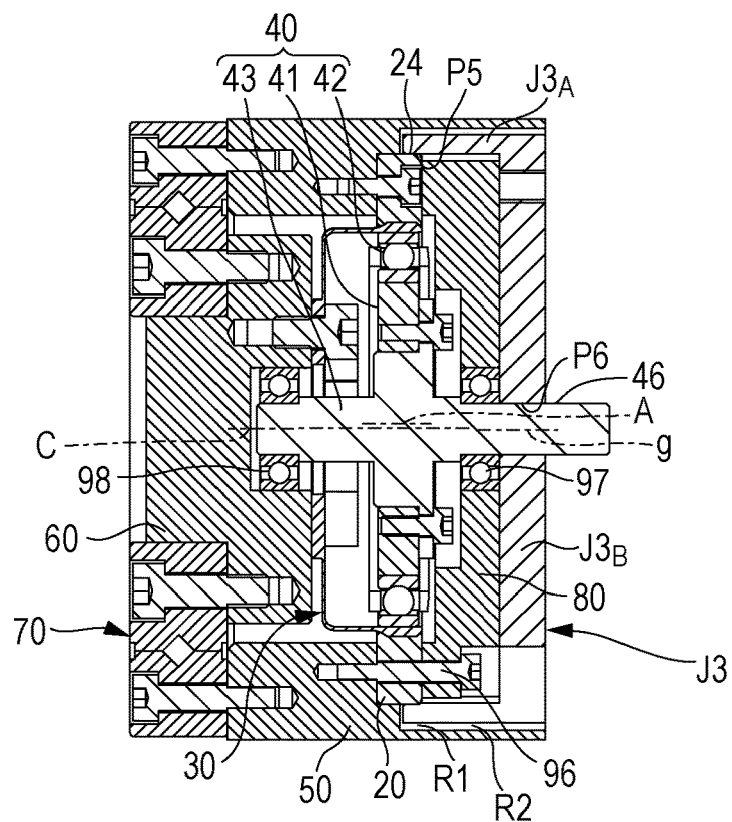
FIGS. 8A and 8B are views for explaining a third positioning step and a fourth securing step of the method of producing the wave gear device according to the first embodiment.
Figure 8B:
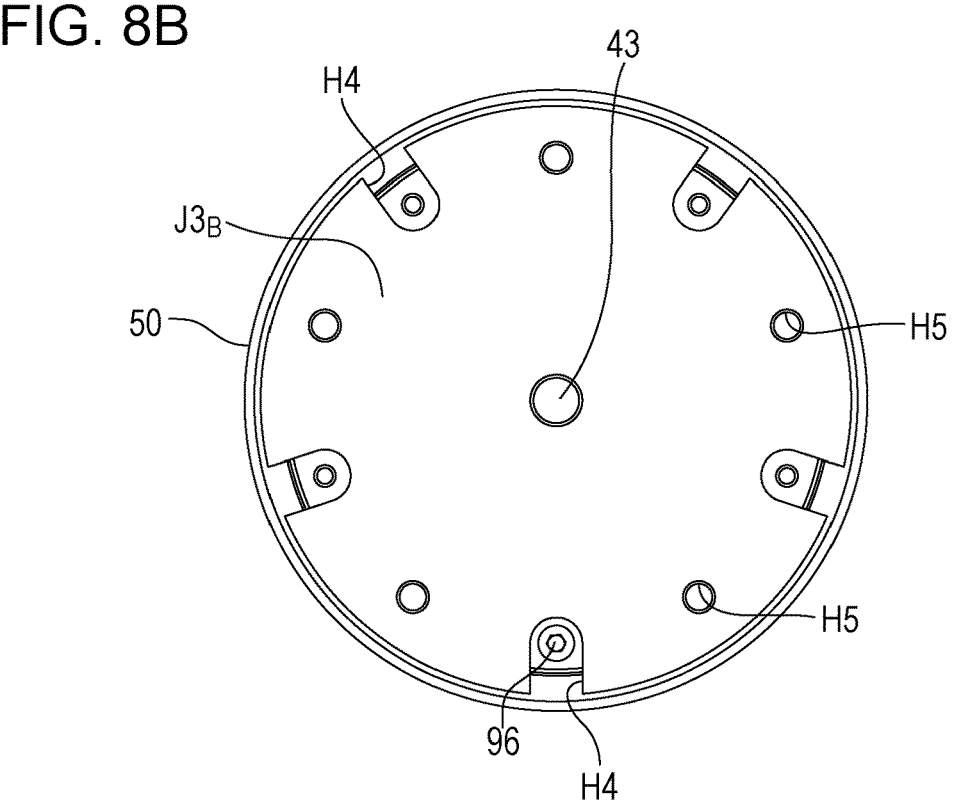

FIGS. 8A and 8B are views for explaining a third positioning step and a fourth securing step. In a state illustrated in FIGS. 8A and 8B, the wave generator 40 is disposed in the housing 50 and positioned, and the support member 80, which supports the wave generator 40, is secured to the housing 50. FIG. 8A is a sectional view of the above-described state, and FIG. 8B is a plan view of the above-described state. FIGS. 9A to 9C illustrate the jig J3. Out of FIGS. 9A to 9C, FIG. 9A is a perspective view of the jig J3, FIG. 9B is a sectional view of jig J3, and FIG. 9C is a plan view of the jig J3.

In the present step, the jig J3, which serves as the jig for positioning the input member (third jig) illustrated in FIGS. 9A to 9C, is prepared. The jig J3 has a reference surface P5 and a reference surface P6. The reference surface P5 serves as a fifth reference surface to be positioned with reference to the circular spline 20. The reference surface P6 serves as a sixth reference surface that positions the wave generator 40. More specifically, the jig J3 has an annular portion J3$_A$ and a planar portion J3$_B$. The annularly shaped annular portion J3$_A$ serves as a third annular portion. The planar portion J3$_B$ radially inwardly extends from the annular portion J3$_A$ and has a through hole H3, through which the shaft portion of the input shaft member 43 is inserted. An inner circumferential surface of the annular portion J3$_A$ is the reference surface P5 and a side wall surface of the through hole H3 is the reference surface P6.

The jig J3 is formed such that the reference surface P5 and the reference surface P6 share a common axis g. The reference surface P5 is brought into engagement with the reference surface 24 of the circular spline 20. The reference surface P6 is brought into engagement with the reference surface 46 of the input shaft member 43. Furthermore, the jig J3 has bolt access holes H4, through which the bolts 96 can be tightened. The support member 80 is secured to the housing 50 by the bolts 96. Furthermore, as jig removal portions that allow the jig J3 to be removed after the input shaft member 43 has been positioned and secured, the jig J3 has, for example, tapped holes H5.

As illustrated in FIG. 8A, the wave generator unit 100 is temporarily disposed in the housing 50, that is, in a unit to which the flex spline 30 has been secured in the above-described third securing step, such that the wave generator 40 is disposed in the flex spline 30. After that, the jig J3 is inserted from behind (support member 80 side) the wave generator unit 100 as illustrated in FIG. 8B.

The reference surface P5 and the outer circumferential surface of the circular spline 20 are brought into engagement with each other by bringing the annular portion J3$_A$ into engagement with the gap R1 and the gap R2, and the reference surface P6 of the through hole H3 and the reference surface 46 of the input shaft member 43 are brought into engagement with each other by inserting the shaft portion of the input shaft member 43 into the through hole H3. The wave generator 40 is positioned relative to the circular spline 20 by bringing the reference surface P5 and the circular spline 20 into engagement with each other and bringing the reference surface P6 and the wave generator 40 into engagement with each other. This simultaneous engagement of the jig J3 with the reference surface 24 of the circular spline 20 and the reference surface 46 of the input shaft member 43 permits the axis C of the input shaft member 43 to be aligned with the axis A of the reference surface 24 of the circular spline 20.

(8) Step of Securing Wave Generator 40 (Fourth Securing Step: FIGS. 8A, 8B, and 9A to 9C)

While the above-described reference surfaces being in their respective engaged states, the support member 80 supporting the wave generator 40, that is, the wave generator unit 100 is secured to the housing 50 by the bolts 96 using the bolt access holes H4 formed in the jig J3. In so doing, since the gap R1 is provided between the housing 50 and the support member 80, the wave generator unit 100 does not interfere with the housing 50 even when the wave generator unit 100 is moved along the jig J3.

After that, when the jig J3 is removed by using the tapped holes H5, the wave gear device 10 is completed. In the present step, the wave generator 40 is secured with reference to the reference surface 24 of the circular spline 20.

According to the method of producing of the first embodiment having been described, instead of attaching a circular spline, a flex spline, and a wave generator with reference to a housing as in the related art, attachment of the flex spline 30 and the wave generator 40 in the housing 50 with reference to the circular spline 20. Accordingly, work for highly accurate processing of the housing 50 can be reduced compared to that in the related art. This allows the central axes of the circular spline 20, the flex spline 30, and the wave generator 40 to be accurately aligned with one another and time required for production to be reduced.

Furthermore, the flex spline 30 and the wave generator 40 are secured with reference to the reference surface 24 of the circular spline 20. Thus, compared to related-art examples, the three main elements are positioned with reduced engaged portions. This can realize the attachment with increased accuracy. Furthermore, time required for assembling the wave gear device 10 can be reduced.

Furthermore, since the gap R1 is provided in the housing 50, assembly can be easily performed without interference between the housing 50 and the jigs J1 to J3.

Furthermore, processing of the outer diameter portion of the support member 80, which requires highly accurate processing in the related art, becomes easy. The length of the highly accurately processed part of the housing 50, the part being provided for engagement with the circular spline, that is, the reference surface 51 on the housing 50 side, was required to be twice that of the circular spline in the related art. In the present embodiment, this length of the highly accurately processed part is required to be a length equal to or less than about a half of that of the circular spline. As a result, the wave gear device 10 is produced with the reduced cost.

The components may be positioned and secured while measuring accuracy in attachment of the components with a measuring instrument such as a dial gauge. However, since the components are positioned and secured by using the jigs J1 to J3 in the first embodiment, assembly can be easily performed, and accordingly, assembly time can be reduced. The outer circumferential surface 24 of the circular spline 20 and the outer circumferential surface 81 of the support member 80 are spaced apart from the inner circumferential surface 52 of the housing 50, thereby the gaps R1 and R2 are formed. Thus, the flex spline 30 and the wave generator 40 can be positioned with reference to the circular spline 20 by using the jigs J1 to J3.

EXAMPLE

Effects of performance improvement of an articulated multi-axis robot arm, in which the wave gear device 10 produced by the method of producing according to the first embodiment is used, were actually checked.

A position/path repeatability is one of performance criteria for an articulated multi-axis robot arm (JIS B 8432: Manipulating industrial robots-Performance criteria and related test methods). In this testing, variation in motion path for a given instruction path is observed. This performance criterion significantly affects rotational accuracy of the axes. When the rotational accuracy of the axes is low, the motion path significantly varies for a single instruction path.

Table lists measured deviation amounts by which the actual motion path deviates from the shortest path between point A and point B in a movement between point A to point B, which are located within a movable range of the articulated multi-axis robot arm. The deviation amount is zero when the articulated multi-axis robot moves in the shortest path. That is, a smaller deviation amount means better performance.

A measurement path 1 and a measurement path 2 are movement paths. Each of the movement paths is set between two points spaced apart from each other by 50 mm. The results of the performance evaluation are as listed in Table. In comparison with the articulated multi-axis robot arm using the wave gear device produced by the related-art (Japanese Patent Laid-Open No. 2009-257409) method of producing, improved results were obtained with the articulated multi-axis robot arm using the wave gear device produced by the method of producing according to the present example.

TABLE (unit: mm)

| | Related-art configuration/ assembly | Present example configuration/ assembly | Coordinates of point A | Coordinates of point B |
|---|---|---|---|---|
| Measurement path 1 | 0.119 | 0.069 | 250 0 600 | 250 0 550 |
| Measurement path 2 | 0.069 | 0.040 | 450 0 400 | 450 0 350 |

*Origin of coordinates: intersection of robot-arm first axis and attachment surface.

In the measurement path 1, the deviation amount is 0.119 mm with the related-art. This is decreased to 0.069 mm, or by about 40% (0.050 mm). In the measurement path 2, the deviation amount is 0.069 mm with the related-art. This is decreased to 0.040 mm, or by about 40% (0.029 mm). Thus, engagement of the components, which were not easy in the related-art, can be smoothly performed.

Thus, the flex spline 30 and the wave generator 40 are positioned relative to the circular spline 20 with improved accuracy compared to that of the related-art, which is determined by the engagement. Accordingly, rotational accuracy of the wave gear device 10 is improved. This improves the position/path repeatability of the robot arm. Furthermore, time required for assembling the wave gear device 10 can be reduced. This reduces assembly time of the robot arm.

Furthermore, since the gap R1 is provided in the housing 50, assembly can be easily performed without interference between the housing 50 and the jigs J1 to J3. Furthermore, processing of the outer diameter portion of the support member 80, which was required to be highly accurate processed in the related art, becomes easy. The length of a highly accurately processed part of the housing 50, the part being provided for engagement with the circular spline, was required to be twice that of the circular spline in the related art. In the present embodiment, this length of the highly accurately processed part is required to be about a half of that of the circular spline. As a result, the cost can be reduced.

Second Embodiment

Next, a method of producing the wave gear device according to a second embodiment of the present invention is described. In the above-described first embodiment, the first positioning step and the second positioning step are separately performed with the different jigs J1 and J2, respectively. In the second embodiment, the first positioning step and the second positioning step are simultaneously performed with a common jig.

Figure 10:
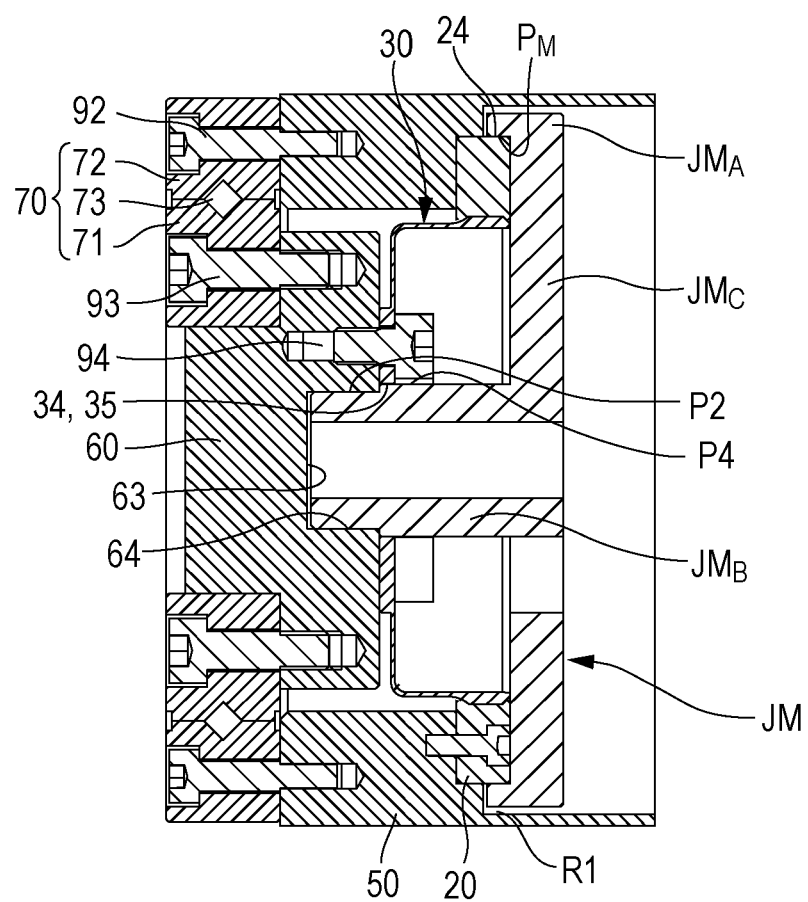
FIG. 10 is a view for explaining a first positioning step, a second positioning step, a second securing step, and a third securing step of the method of producing the wave gear device according to a second embodiment.
Figure 11A:
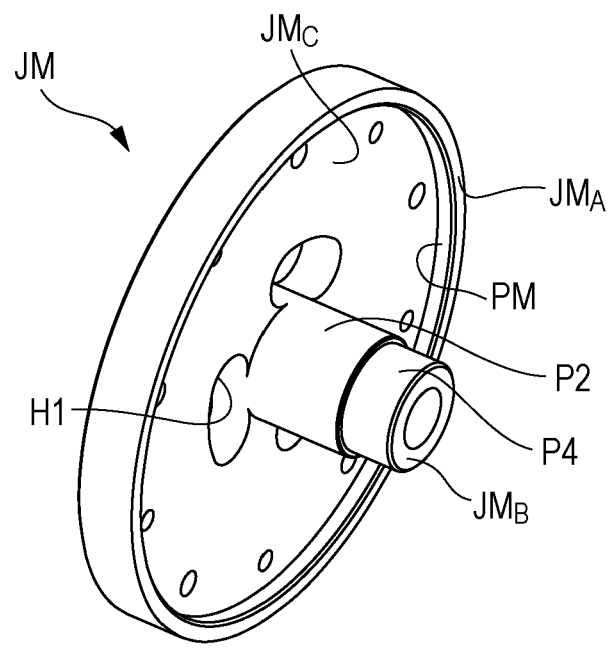
FIGS. 11A to 11C illustrate a common jig.
Figure 11B:
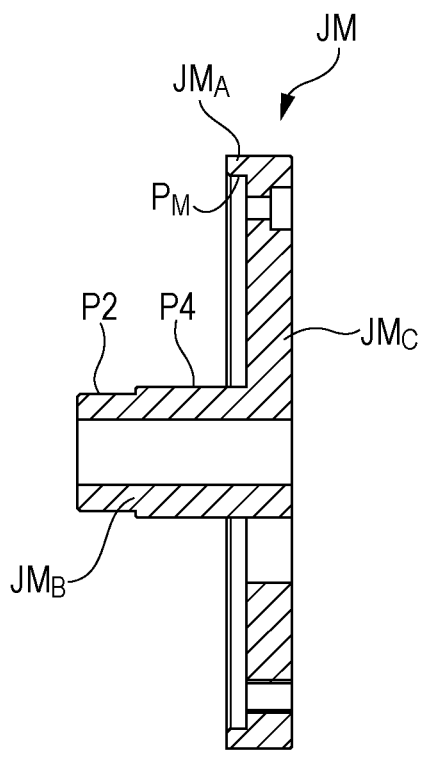
Figure 11C:
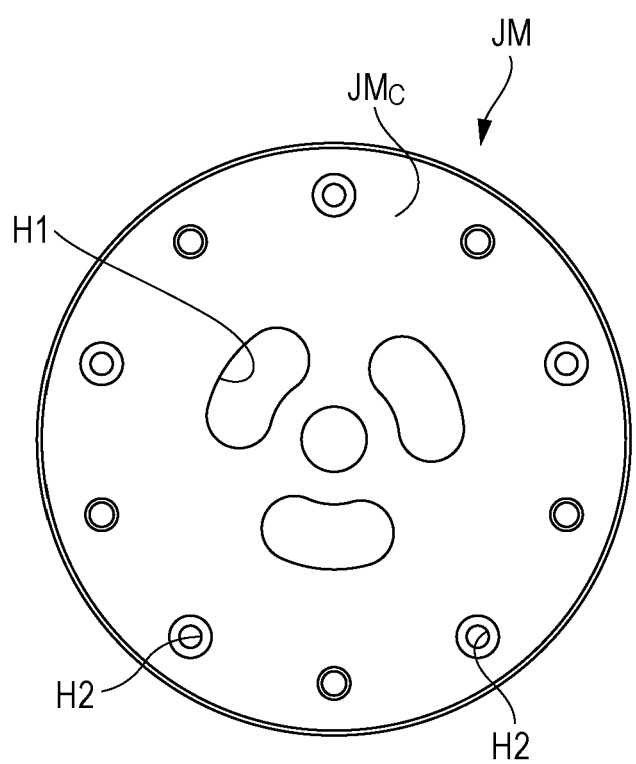

FIG. 10 is a view for explaining the first positioning step, the second positioning step, the second securing step, and the third securing step of the method of producing the wave gear device according to the second embodiment. FIGS. 11A to 11C illustrate a common jig. Out of FIGS. 11A to 11C, FIG. 11A is a perspective view of the common jig, FIG. 11B is a sectional view of the common jig, and FIG. 11C is a plan view of the common jig. Since the structure of the wave gear device is similar to that of the first embodiment, the same reference signs denote the same elements and the description thereof is omitted. The jigs J1 and J2 can be integrated with each other when the following condition is satisfied: diameter of reference surface 35 of flex spline 30≤diameter of reference surface 62 of output member 60. Thus, in the second embodiment, a common jig JM, which is formed by integrating the jigs J1 and J2 of the first embodiment with each other, is used.

The common jig (integrated jig) JM is a jig in which the jigs J1 and J2 of the first embodiment are integrally formed. The common jig JM has an annular portion $JM_A$, a shaft portion $JM_B$, and a connecting portion $JM_C$. The shaft portion $JM_B$ is coaxial with the annular portion $JM_A$. The connecting portion $JM_C$ connects the annular portion $JM_A$ and the shaft portion $JM_B$ to each other. An inner circumferential surface of the annular portion $JM_A$ has a common reference surface $P_M$, which serves as both the first reference surface and the third reference surface described in the first embodiment.

An outer circumferential surface of the shaft portion $JM_B$ has the reference surface P2 serving as the second reference surface P2 and the reference surface P4 serving as the fourth reference surface, which is shifted from the reference surface P2 in the axial direction.

Similarly to the jig J2 of the first embodiment, the common jig JM has the bolt access holes H1 and, for example, the tapped holes H2 serving as jig removal portions.

In the first positioning step, the reference surface 24 of the circular spline 20 and the annular portion $JM_A$ are brought into engagement with each other, and then the shaft portion $JM_B$ is brought into engagement with the hole portion 63. This causes the axis of the circular spline 20 and the axis of the output member 60 to be aligned with each other (within an allowable range). Since the gap R1 is provided between the housing 50 and the annular portion $JM_A$, positioning can be performed without application of an excessive force for positioning.

In the second positioning step, the shaft portion $JM_B$ is brought into engagement with the hole portion 34 formed in the attachment portion 32 of the flex spline 30 while the common reference surface $P_M$ of the annular portion $JM_A$ and the reference surface 24 of the circular spline 20 are engaged with each other. This allows the reference surface P4 and the reference surface 35 of the hole portion 34 to be positioned.

In these first and second positioning steps, the output member 60 and the flex spline 30 are positioned relative to the circular spline 20.

In the second embodiment, both of the first positioning step and the second positioning step are simultaneously performed before both of the second securing step and the third securing step is performed. That is, the first positioning step and the second positioning step are continuously performed without removing the common jig JM.

After the first positioning step and the second positioning step have been performed, the outer race 72 of the bearing 70 is secured to the housing 50 by the bolts 92 and the output member 60 is secured to the inner race 71 of the bearing 70 by the bolts 93 (second securing step). Also, the flex spline 30 is secured to the output member 60 by the bolts 94 by using the holes H1 of the common jig JM (third securing step).

By using the common jig JM, which is an integrated jig, as described above, the bearing 70, the output member 60, and the flex spline 30 can be simultaneously secured with reference to the reference surface 24 of the circular spline 20. Thus, time required for assembly can be further reduced.

The present invention is not limited to the above-described embodiments, and many variants are possible within the technical concept of the present invention.

Although no material is disposed in the gaps R1 and R2 in the produced wave gear device 10 in the above described embodiments, a material such as insulating material (for example, filler such as resin) or a metal material may be disposed in the gaps R1 and R2.

According to the present invention, work for producing the housing can be reduced compared to that in the related art. This allows the central axes of the circular spline, the flex spline, and the wave generator to be accurately aligned with one another and time required for production to be reduced.

Also, in the wave gear device according to the present invention, the outer circumferential surface of the circular spline and the outer circumferential surface of the support member are spaced apart from the inner circumferential surface of the housing. Thus, the flex spline and the wave generator can be positioned with reference to the circular spline.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A wave gear device comprising:
   a cylindrical housing that has an inner circumferential surface;
   an annular circular spline that is attached to an inside of the housing and has internal teeth;

a flex spline that has a cylindrical barrel portion, which has external teeth, and an attachment portion, which inwardly extends from an end of the barrel portion in a radial direction, and that is disposed inside the circular spline;

a wave generator that is disposed inside the flex spline, that deforms the flex spline in the radial direction to bring part of the flex spline into engagement with part of the circular spline, and that moves an engagement position, where the internal teeth of the circular spline are in engagement with the external teeth of the flex spline, in a circumferential direction;

a first bearing that has an outer race, which is secured to the housing;

a second bearing that is disposed inside the housing;

a support member that supports the wave generator through the second bearing such that the wave generator is rotatable, the support member being secured to the housing via the circular spline; and a securing member that secures the circular spline to the cylindrical housing without securing the support member to the circular spline, the support member being disposed over the securing member, wherein an outer circumferential surface of the circular spline is not in contact with the inner circumferential surface of the housing, and wherein a greatest outer diameter of the support member is less than a greatest outer diameter of the circular spline in a radial direction.

2. The wave gear device according to claim 1, wherein the outer circumferential surface of the circular spline is parallel to a center axis of the circular spline.

3. The wave gear device according to claim 1, wherein the support member is not in contact with the inner circumferential surface of the housing.

4. The wave gear device according to claim 1, wherein the wave gear device further includes an output member, and the output member is attached to the attachment portion.

5. The wave gear device according to claim 1, wherein the securing member includes a bolt.

6. A robot, comprising:
a robot arm which includes an articulation in which a drive motor and a wave gear device are disposed,
wherein the wave gear device includes a cylindrical housing that has an inner circumferential surface;

an annular circular spline that is attached to an inside of the housing and has internal teeth;

a flex spline that has a cylindrical barrel portion, which has external teeth, and an attachment portion, which inwardly extends from an end of the barrel portion in a radial direction, and that is disposed inside the circular spline;

a wave generator that is disposed inside the flex spline, that deforms the flex spline in the radial direction to bring part of the flex spline into engagement with part of the circular spline, and that moves an engagement position, where the internal teeth of the circular spline are in engagement with the external teeth of the flex spline, in a circumferential direction;

a first bearing that has an outer race, which is secured to the housing; a second bearing that is disposed inside the housing; and a support member that supports the wave generator through the second bearing such that the wave generator is rotatable, the support member being secured to the housing via the circular spline; and a securing member that secures the circular spline to the cylindrical housing without securing the support member to the circular spline, the support member being disposed over the securing member, wherein an outer circumferential surface of the circular spline is not in contact with the inner circumferential surface of the housing, and wherein a greatest outer diameter of the support member is less than a greatest outer diameter of the circular spline in a radial direction.

7. The robot according to claim 6, wherein the outer circumferential surface of the circular spline is parallel to a center axis of the circular spline.

8. The robot according to claim 6, wherein the support member is not in contact with the inner circumferential surface of the housing.

9. The robot according to claim 6, wherein the wave gear device further includes an output member, and the output member is attached to the attachment portion.

10. The robot according to claim 6, wherein the securing member includes a bolt.

* * * * *